(No Model.)
W. HAAKER.
TIN CAN.
No. 503,265. Patented Aug. 15, 1893.
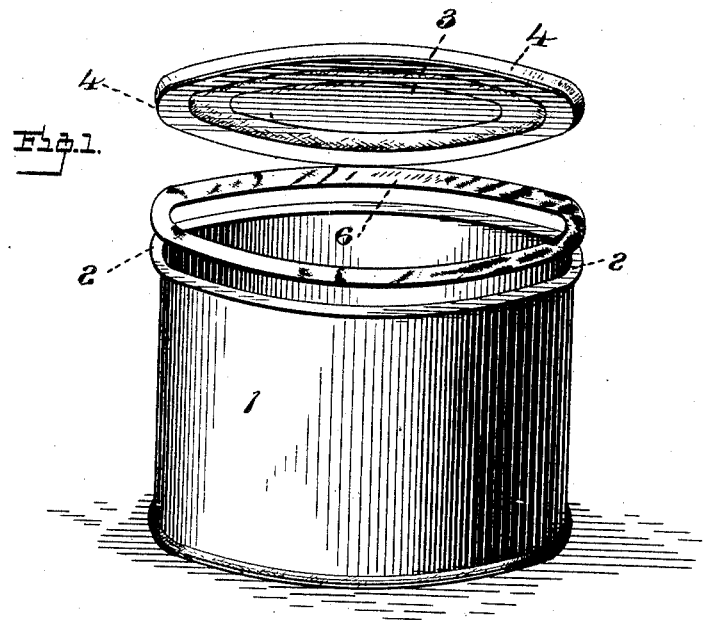
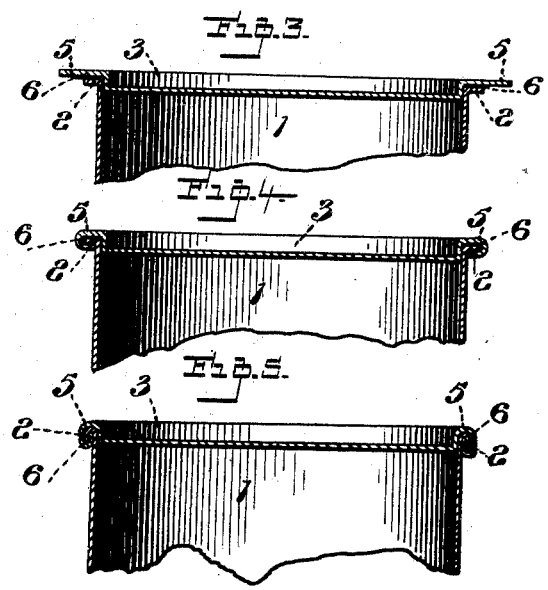
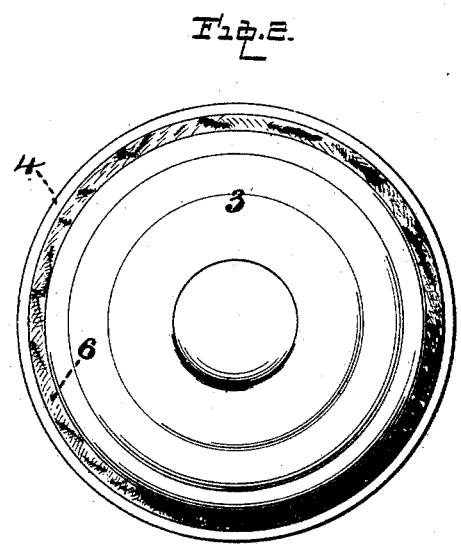
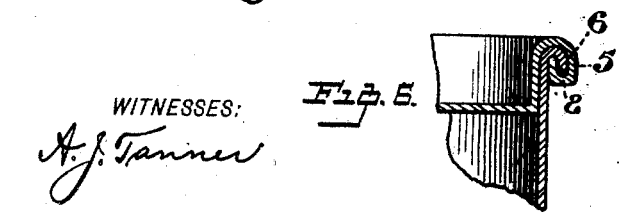
WITNESSES:
A. J. Tanner
C. M. Newman
INVENTOR:
William Haaker
BY
S. H. Hubbard
ATTORNEY

UNITED STATES PATENT OFFICE.

WILLIAM HAAKER, OF NEW YORK, N. Y.

TIN CAN.

SPECIFICATION forming part of Letters Patent No. 503,265, dated August 15, 1893.

Application filed May 20, 1892. Serial No. 433,687. (No model.)

*To all whom it may concern:*

Be it known that I, WILLIAM HAAKER, a citizen of the United States, residing at New York, in the county of New York and State of New York, have invented certain new and useful Improvements in Tin Cans; and I do hereby declare the following to be a full, clear, and exact description of the invention, such as will enable others skilled in the art to which it appertains to make and use the same.

This invention relates to certain novel and useful improvements in the method of and means for sealing tin cans such as are used for packing meats, fish, vegetables, caviare, and the like, and the object of my invention is to provide means whereby the joint between the head or cover of the can may be tightly sealed in order to exclude air. I propose also to dispense with any sealing device or substance, such as solder, which can come in contact with and thereby injure the contents of the can.

It is further an object of my invention to improve upon the means for and method of sealing cans which are shown and described in United States Letters Patent to A. H. Fancher, No. 246,381, dated August 30, 1881, in which I own a part interest.

I am aware that prior to my invention many devices for effecting the air tight sealing of cans of this description have been proposed; among others a layer of cement. And I am also aware that in the sealing of glass fruit cans rubber rings or gaskets have been used in combination with a depressible cover, but I am not aware that any method of permanently sealing tin cans has been practiced either here or in Europe, which contemplates the use of my invention which consists, as will be hereinafter pointed out in the claim, in the combination with the parts of a can of a washer or ring of paper interposed between the abutting horizontal surfaces of the parts of the can, which parts are then crimped inward with a double-lap joint or seam. It is obvious that an ordinary thick rubber gasket could not be used in this connection, since it would not permit the seam to be properly turned, and it would at the same time be too expensive and clumsy.

In order that those skilled in the art to which my invention appertains may fully understand its nature and method of operation, I will describe the same in detail, reference being had to the accompanying drawings and the numerals of reference marked thereon, which form a part of this specification.

Figure 1, shows in perspective the can, the cover and the washer prior to assembling. Fig. 2, is a bottom plan view of the cover with the washer in assembled position thereon. Fig. 3, shows all the parts assembled and ready for the closing operation. Fig. 4, is a sectional view similar to Fig. 3, showing a single lap formed in the edge. Fig. 5, is a view similar to Figs. 3 and 4 showing the double lap. Fig. 6, is an enlarged detail of the seam shown at Fig. 5.

The can, which I denote by the numeral 1, is made of tin or other sheet metal in any usual manner and is provided at its top edge with a narrow outwardly turned flange at right angles to the walls of the can.

3 denotes the top or cover which has near its edge a vertical shoulder 4 formed thereon by a depression at the center of said cover. This shoulder is adapted to fit closely into the top of the can, as shown at Fig. 3. Said cover has also the outwardly extending flange 5 of about double the width of the flange 2.

6 denotes a washer composed of paper. The size of this washer is such as to cause it to fit closely around the shoulder 4 in contact with the under face of the flange 5.

In the practical operation of my improvement the can is first filled and then a washer is placed in position upon the cover in the manner just described. The downwardly projecting shouldered portion of the cover is then inserted into the top of the can, as shown in Fig. 3, the abutting surfaces of the vertical walls of the can and cover forming a close joint and the faces of the flanges close together with the washer interposed between them. In closing the can the outwardly projecting edge of the flange 5 is turned under into U form, so as to lock beneath the lower edge of the flange 2, as appears at Fig. 4. Thereby the washer is turned or folded about the outer edge of the flange 2. The single lap seam thus formed projects outwardly at right angles to the body of the can, as shown at Fig. 4, and this seam is again crimped downward and inward to the position shown at Figs. 5 and 6, so that the joint is a double lap or seam with the washer tightly compressed between the abutting surfaces of the flanges. In making a seam of this kind it is in the highest degree essential that the paper before the formation of the seam or lap shall lie perfectly smooth and even between the surfaces and that it shall fit closely against the flange 4 at every point, whereby it may be secured firmly in place and all sliding will be prevented. If a sheet of paper be placed between the head and body of the can, and the former then placed upon the latter, the paper will buckle or crimp and the strain caused by the insertion is likely to tear it near its edges, in either case causing an imperfection in the joint which may leak and spoil the goods. The same defects are liable to occur if the washer does not fit snugly against the flange or wall 4, because of the liability to slip in such event. The washer when placed around the shoulder of the cover fits tightly and will remain, lying smoothly against the face of the flange, so that the cover may be freely handled and when put on the can the washer will invariably lie perfectly smooth between the abutting faces. A flat sheet or strip of paper cannot practically be so introduced between the cover and the can body that it will project equally all around and it is impossible to crimp the edges of such a sheet or disk as to make a smooth and tight joint. The presence of any lining or foreign substance, such as a sheet of paper, in contact with the goods is furthermore highly detrimental, as it tends to injure the flavor of the contents.

I have described the sealing of one end only of the can, and that after filling. It will of course be understood, however, that this process may be applied in inserting the lower head of the can before its contents are introduced. After the sealing of the can, as above described, it may be be "processed," that is, an opening formed in the top of the can, heat applied to expel the air, and then the can resealed.

I claim—

The combination with a can having an outwardly extending annular flange at its edge, of a cover therefor having a depressed central portion bounded by a perpendicular wall having a right-angled flange of a width greater than that of the can body, and a paper washer interposed between the flanges of the can and the body and having a width greater than that of the flange of the can body and less than that of the flange of the cover, the said washer fitting closely against the said perpendicular wall, whereby it may be clamped in three directions and held securely in place during the process of curling and uniting the flanges in the manner as hereinbefore set forth.

In testimony whereof I affix my signature in presence of two witnesses.

WILLIAM HAAKER.

Witnesses:
S. H. HUBBARD,
C. M. NEWMAN.